United States Patent [19]
Schaffner

[11] Patent Number: 5,548,668
[45] Date of Patent: Aug. 20, 1996

[54] VELOCITY-MATCHED ELECTRODES FOR ELECTRO-OPTIC TRAVELLING-WAVE MODULATORS AND METHOD FOR FORMING THE SAME

[75] Inventor: James H. Schaffner, Chatsworth, Calif.

[73] Assignee: Hughes Aircraft Company, Los Angeles, Calif.

[21] Appl. No.: 328,222

[22] Filed: Oct. 25, 1994

[51] Int. Cl.$^6$ .................................................... G02F 1/01
[52] U.S. Cl. ............................ 385/1; 385/2; 385/8; 385/9
[58] Field of Search ................................. 385/1, 2, 8, 9, 385/131, 132

[56] References Cited

U.S. PATENT DOCUMENTS 4,770,483  9/1988  Ridgway ..................... 385/2

OTHER PUBLICATIONS

Noguchi et al; "A Ti:LiNbO$_3$ Optical Intensity Modulator . . ." *IEEE Photonics Tech. Letters*; vol. 3, No. 4; Apr. 1991; pp. 333–335.

Haeyang Chung, William S. C. Chang, "Modeling and Optimization of Traveling-Wave LiNbO$_3$ Interferometric Modulators", *IEEE Journal of Quantum Electronics*, vol. 27, No. 3, Mar. 1991, pp. 608–617.

Kazuto Noguchi, Kenji Kawano et al., "A Ti:LiNbO$_3$ Optical Intensity Modulator with More than 20 GHz Bandwidth and 5.2 V Driving Voltage", *IEEE Photonics Technology Letters*, vol. 3, No. 4, Apr., 1991, pp. 333–335.

R. V. Schmnidt, "Integrated Optics Switches and Modulators," in *Integrated Optics: Physics and Applications*, ed. S. Martelluci and A. N. Chester (N.Y. Plenum Pres, Jan. 1981) pp. 181–210.

G. K. Gopalakuishnan et al., "40 GHz Low Half–Wave Voltage Ti:LiNbO$_3$ Intensity Modulator", *Electronics Letters*, vol. 28, No. 9 (1992), pp. 826–827.

D. W. Dolfi and T. R. Ranganath, "50 GHz Velocity-–Matched Broad Wavelength LiNbO$_3$ Modulator with Multimode Active Section", *Electronics Letters*, vol. 28, No. 13, (Jun. 1992), pp. 1,197–1,198.

Juan F. Lam and Gregory L. Tangonan, "A Novel Optical Modulator System with Enhanced Linearization Properties", *IEEE Photon. Tech. Lett.*, vol. 3, No. 12 (Dec. 1991), pp. 1,102–1,104.

*Primary Examiner*—Rodney B. Bovernick
*Assistant Examiner*—Robert E. Wise
*Attorney, Agent, or Firm*—V. D. Duraiswamy; W. K. Denson-Low

[57] ABSTRACT

Velocity-matched electrodes that are sufficiently index-matched to use in linearized directional-coupler modulators are provided by placing a low dielectric constant material layer over the travelling-wave modulator electrodes, followed by a metal layer that is electrically connected to a ground electrode. The low dielectric constant layer between the grounded metal layer and the active electrode lowers the effective RF dielectric constant, which lowers the RF index of refraction. The RF index of refraction is matched to the optical index of refraction by controlling the thickness of the low dielectric constant layer, which is deposited with standard RF sputtering techniques that allow for precise control over the layer thickness. As a result, more precise velocity matching and greater reproducibility than with prior velocity matching techniques is achieved.

16 Claims, 5 Drawing Sheets

VELOCITY-MATCHED ELECTRODES FOR ELECTRO-OPTIC TRAVELLING-WAVE MODULATORS AND METHOD FOR FORMING THE SAME

BACKGROUND OF THE INVENTION

1. Field of the Invention

This invention relates to electro-optic modulators and more specifically to an electro-optic modulator capable of high speed linear operation.

2. Description of the Related Art

Optical modulators are used in fiber optic communication systems. As the speed of these systems increases, optical modulators with broader modulation bandwidths are required.

A common optical modulator is a directional coupler modulator fabricated on a lithium-niobate substrate. A detailed description of this device can be found in R. V. Schmidt, "Integrated Optics Switches and Modulators," *Integrated Optics: Physics and Applications*, ed. S. Martelluci and A. N. Chester (New York: Plenum Press, 1981), pp. 181–210.

In a directional coupler modulator, illustrated in FIG. 1, two parallel waveguides 10 and 12 are fabricated on a lithium-niobate substrate 14 in close proximity so that light 16 launched into one waveguide (the reference arm) couples to the other waveguide (the signal arm) via evanescent coupling. If the waveguides have the same propagation constants, light launched into the reference arm will transfer completely to the signal arm in a distance $l=\pi/2\kappa$, where $\kappa$ is the coupling coefficient which describes the strength of the interguide coupling. Electrodes 18 and 20 are placed over the waveguides 10 and 12 in the coupler region.

As illustrated in the cross-sectional view of FIG. 2, when a voltage is applied across the electrodes, the electric field lines 22 normal to the substrate 14 surface are oppositely directed in each waveguide. The oppositely directed electric fields produce a phase mismatch (or propagation constant mismatch) by increasing the refractive index in one guide and decreasing it in the other through the linear electro-optic effect. The degree of light transfer along a given length via evanescent coupling depends on the difference in propagation constants between the waveguides. Therefore, the optical switching can be controlled with the applied electric fields.

The speed at which an electro-optic coupler can operate is limited by the transit time of the light through the waveguide. Ideally, an optical wave that is launched into the coupler will see a constant electric field strength as it travels the length of the coupler. However, at very high modulation frequencies (RF frequencies), the travelling optical wave will be subjected to a time-varying electric field as it travels through the waveguide.

A travelling-wave modulator, illustrated in FIG. 3, overcomes this problem to an extent by applying the voltage (with a voltage source 24) at one end of the active electrode 18, which serves as a transmission line for the electrical wave. The other end of the active electrode 18 is terminated in a load impedance 19 equal to the electrode's transmission line impedance to prevent the reflection of travelling electrical waves back toward the source 24. If the velocity of the travelling electrical wave matches that of the optical wave, transit time effects can be eliminated. However, the bandwidth of travelling-wave modulators is limited because of a velocity mismatch between the optical wave and the electrical wave at RF modulation frequencies. At RF frequencies, the index of refraction for RF electrical waves (typically about 3.5 to 4.0) is higher than the index of refraction for the optical wave (2.15 for an optical wavelength of 1.3 microns). As a result, the velocities are not matched and the optical wave experiences a changing electric field as it propagates through the modulator.

The velocity mismatch problem also impacts linearized directional-coupler modulators. Linearized directional-coupler modulators, such as the one illustrated in FIG. 4 and described in Juan F. Lam and Gregory L. Tangonan, "A Novel Optical Modulator System with Enhanced Linearization Properties", *IEEE Photon. Tech. Lett.*, vol. 3, No. 12 (1991), pp. 1,102–1,104 and in Juan F. Lam and Gregory L. Tangonan, "A Novel Optical Modulator System with Enhanced Linearization Properties: An Erratum", *IEEE Photon. Tech. Lett.*, vol. 4, No. 6 (1992), p. 670, are a special class of modulator that reduce nonlinear distortion effects that are common in standard modulators. This type of modulator has an optical directional coupler (10 and 12) approximately twice as long as the directional coupler of FIG. 1 and an extra set of electrodes 26 and 28 for applying a DC bias voltage 30 to the waveguides.

If the DC bias voltage 30 is set to zero, then the energy transfer curve is the same as for a standard travelling wave modulator, as illustrated in FIG. 5a. FIG. 5a illustrates the energy transfer curve for a standard travelling-wave modulator, such as the modulator of FIG. 3, whose waveguides are two coupling lengths long (light launched into the reference arm 10 completely couples to the signal arm 12 and back to the reference arm 10 before exiting the coupler, when no voltage is applied). This curve shows the amount of light that exits the signal arm as a function of the applied voltage. It is apparent from this graph that the amount of light that exits the signal arm varies nonlinearly with applied voltage. This presents a problem if one wants to modulate the output light at high frequencies, at which the nonlinear nature of the energy transfer curve results in second harmonic and third-order intermodulation distortion of the output signal.

Referring back to FIG. 4, a DC voltage 30 can be applied across electrodes 26 and 28 such that the energy transfer curve exhibits a linearized region, as shown in FIG. 5b. If the modulator is biased to the midpoint of the linearized region 32, high linearity modulation can be achieved. However, the high linearity modulation degrades at high modulation frequencies due to the velocity mismatch phenomena discussed above. As the linearity degrades, nonlinear distortion effects appear.

Some prior modulators, such as those described in D. W. Dolfi and T. R. Ranganath., "50 GHz Velocity-Matched Broad Wavelength LiNbO$_3$ Modulator with Multimode Active Section", *Electronics Letters*, Vol. 28, No. 13 (1992), pp. 1,197–1,198 and in G. K. Gopalakrishnan et al., "40 GHz, Low Half-Wave Voltage Ti:LiNbO$_3$ Intensity Modulator", Electronics Letters, Vol. 28, No. 9 (1992), pp. 826–827, have attempted to match the RF index of refraction to the optical index of refraction by using gold electrodes that are 10 microns or more thick. The thicker electrodes lower the effective RF index, but these modulators are of the interferometric variety which do not utilize evanescent coupling between the waveguides as the modulation mechanism. As a result, the waveguides can be separated by 10 microns or more, which facilitates the fabrication of thick gold electrodes using gold plating techniques.

In contrast, directional-coupler modulators that utilize evanescent coupling must have waveguides that are typically separated by 6 microns or less. In addition, the waveguides in directional-couplers are typically 2 to 3 cm long. It is difficult to reliably fabricate thick gold electrodes over waveguides that are that close together with uniform thickness over a 2 to 3 cm length. As a result, device yields go down when the thick electrode technique is utilized to match the indices of refraction in directional-coupler modulators.

Another technique for matching the RF and optical indices of refraction is described in Kazuto Noguchi et al., "A Ti:LiNbO$_3$ Optical Intensity Modulator with More Than 20 GHz Bandwidth and 5.2 V Driving Voltage", *IEEE Photon. Tech. Lett.*, Vol. 3, No. 4 (1991), pp. 333–335. The modulator used by Noguchi, a cross-section of which is illustrated in FIG. 6, is a Mach-Zehnder interferometric modulator (as opposed to a directional-coupler modulator) with symmetric ground electrodes 34 positioned on each side of an active electrode 36. One of the two waveguides 37 is positioned underneath the active electrode 36 and the other is positioned underneath one of the ground electrodes 34.

The index matching is achieved by placing a top metal shield 37 over the two waveguides 38, with the metal shield in electrical contact with both ground electrodes 34. The metal shield 38 is fabricated separately and cemented to the ground electrodes 34 with adhesive. The air gap 40 between the metal shield 38 and the active electrode 36 lowers the effective RF refractive index because of the low dielectric constant of air (1.0).

How well the RF and optical indices match is a function of the size of the air gap 40 created by the metal shield 38. The separate fabrication and cementing steps involved in attaching the metal shield to the ground electrodes creates a greater probability that the indices will not be precisely matched and also an increased probability of variation from one device to the next (reduced reproducibility), which can result in lower device yields.

In the linearized directional-coupler modulators discussed above, the linearity of the modulator is more sensitive than the modulation bandwidth to velocity mismatch. Therefore, the RF and optical indices of refraction must be as closely matched as possible to preserve the modulator's linearity at high modulation frequencies. The Noguchi modulator is not a linearized modulator and does not require as precise a velocity match as linearized directional-coupler modulators. Therefore, although the separately fabricated and cemented metal shield in the Noguchi modulator gives sufficient control over the RF index of refraction to increase the modulation bandwidth, it is not precise enough to reproducibly achieve the velocity matching required for linearized directional-coupler modulators.

SUMMARY OF THE INVENTION

In view of the above problems, the present invention provides velocity-matched electrodes that are sufficiently index-matched to use in linearized directional-coupler modulators and a fabrication process that produces higher yields then prior methods of producing velocity-matched electrodes.

These improvements are achieved by placing a low dielectric constant material layer over the modulator electrodes, followed by a metal layer that is electrically connected to a ground electrode. The low dielectric constant layer between the grounded metal layer and the active electrodes lowers the effective RF dielectric constant, which lowers the RF index of refraction. The RF index of refraction is matched to the optical index of refraction by controlling the thickness of the dielectric layer. The dielectric layer is deposited with standard RF sputtering techniques, which allow precise control over its thickness. As a result, more precise velocity matching and greater reproducibility than with prior velocity matching techniques is achieved.

In the preferred embodiment, an SiO$_2$ layer is RF sputtered over the modulator electrodes. The thickness is chosen so that the effective RF index of refraction matches the optical index of refraction at the operating wavelength. A grounded metal layer is formed over the SiO$_2$ layer by depositing gold onto the SiO$_2$ layer, and electrically connecting the gold layer to the ground electrode.

These and other features and advantages of the invention will be apparent to those skilled in the art from the following detailed description of preferred embodiments, taken together with the accompanying drawings, in which:

DETAILED DESCRIPTION OF THE INVENTION

Figure 1:
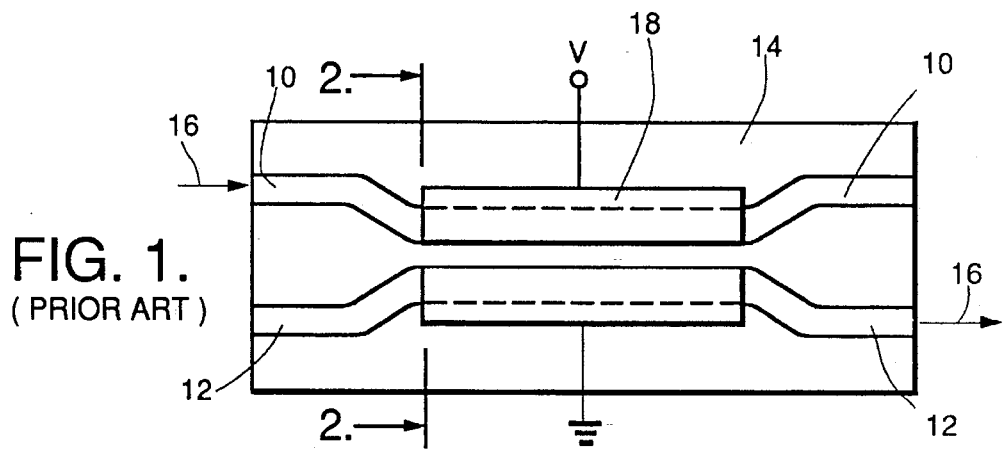
FIG. 1, described above, is a plan view of a prior directional-coupler modulator.
Figure 2:
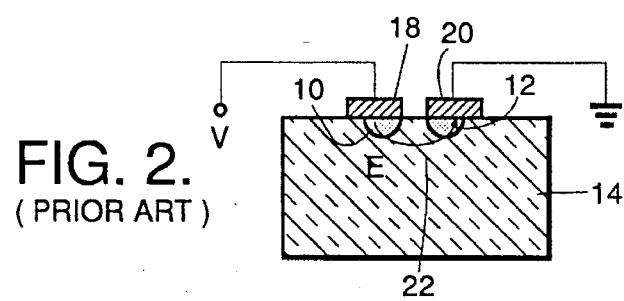
FIG. 2, described above, is a sectional view taken along the section line 2—2 of FIG. 1.
Figure 3:
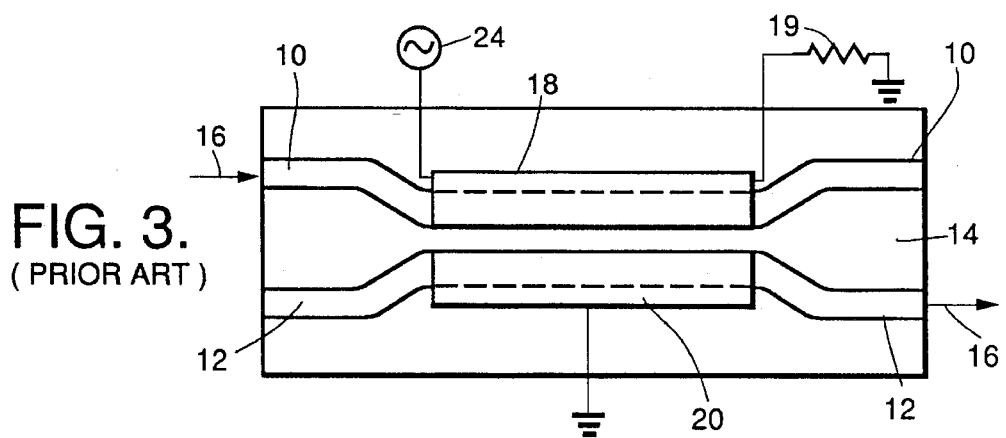
FIG. 3, described above, is plan view of a prior travelling-wave directional-coupler modulator.
Figure 4:
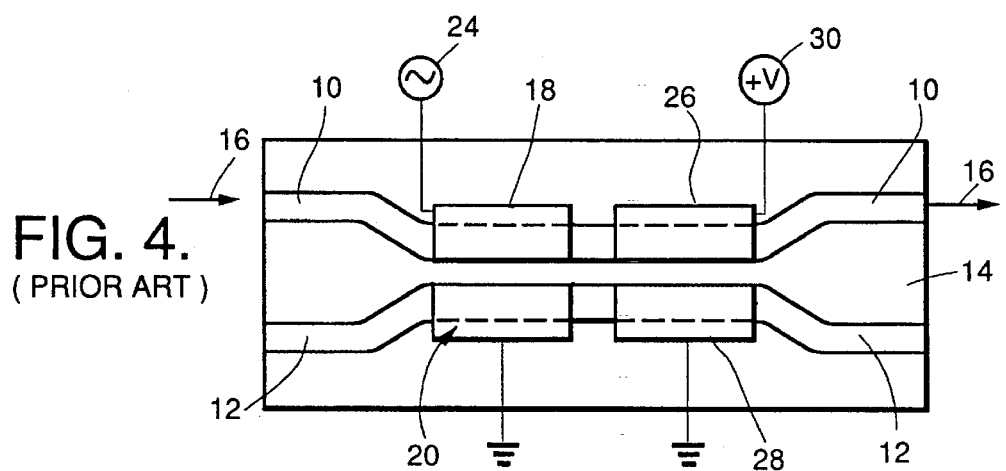
FIG. 4, described above, is a plan view of a prior linearized directional-coupler modulator.
Figure 5A:
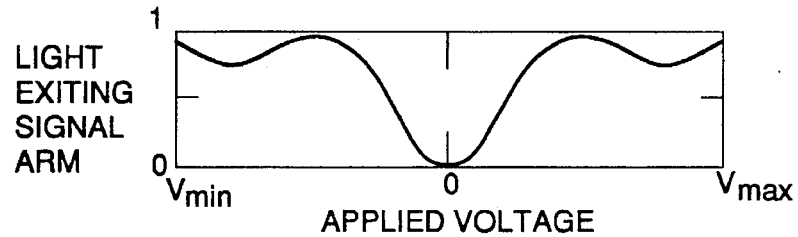
FIG. 5a, described above, is a graph illustrating the energy transfer curve for the modulator of FIG. 4, with no bias voltage applied.
Figure 5B:
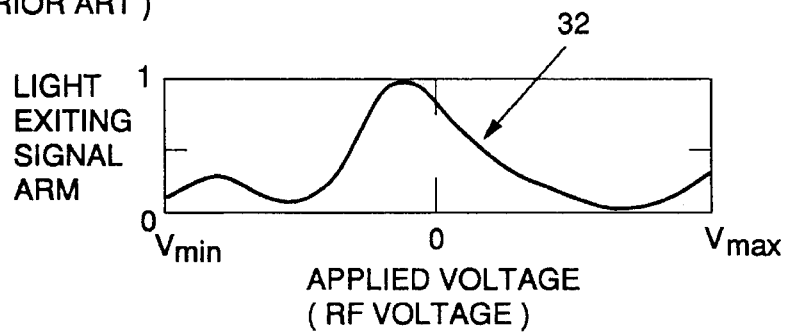
FIG. 5b, described above, is a graph illustrating the energy transfer curve for the modulator of FIG. 4, with a bias voltage applied.
Figure 6:
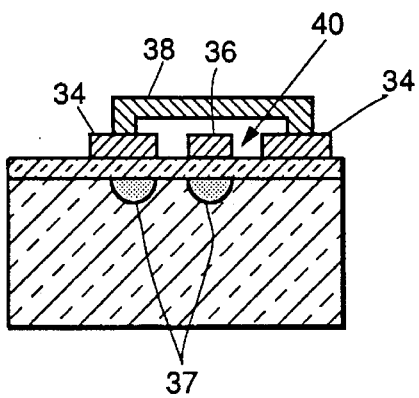
FIG. 6, described above, is a sectional view of a prior Mach-Zehnder modulator with velocity-matched electrodes.
Figure 7:
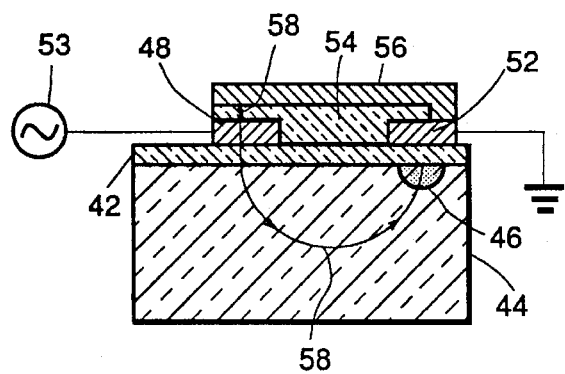
FIG. 7 is a sectional view of a travelling-wave modulator that illustrates the basic concept of the present invention.

FIG. 7 illustrates the basic concept of the invention. A first low dielectric constant layer 42 is disposed on an electro-optic substrate 44 in which an optical waveguide 46 has been fabricated. An active electrode 48 and a ground electrode 52 are disposed on the first dielectric layer 42 for applying an alternating (RF) electric signal from voltage supply 53 across the waveguide 46. The electric field 58 produced by the voltage differential between the two electrodes modulates the propagation constant of the waveguide through the electro-optic effect. The first dielectric layer 42 electrically isolates the waveguide 46 from the ground electrode 52.

A second dielectric layer 54 is disposed on and between the electrodes 48 and 52. A metal layer 56 is disposed on the second dielectric layer 54 and electrically connected to the ground electrode 52. As a result, the electric field 58 extends through the first dielectric layer 42, the portion of the second dielectric layer 54 between electrode 48 and metal layer 56, and the electro-optic substrate 44. The effective dielectric constant that the electric field 58 experiences is a combination of the dielectric constants of the dielectric layers, the electro-optic substrate, and the electrode material in its path.

The dielectric layers 42 and 54 are fabricated from a material that has a lower dielectric constant than the electro-optic substrate. The thickness of the second layer 54 is adjusted so that the effective dielectric constant that the RF electric field experiences matches the dielectric constant that an optical wave experiences as it propagates through the waveguide 46. As a result, the RF index of refraction is matched to the optical index of refraction, and the RF and optical wave velocities are matched.

Since the second dielectric layer 54 is typically formed by RF-sputtering, its thickness can be precisely controlled. This results in a velocity match that is more precise than that achieved by prior velocity-matched electrodes, which makes them particularly suitable for linearized directional-coupler modulators that are highly sensitive to velocity mismatch. However, the electrodes can be used in any other travelling-wave modulator by adjusting the thickness of the second dielectric layer 54 to accomodate the index matching requirements of the particular modulator.

Figure 8:
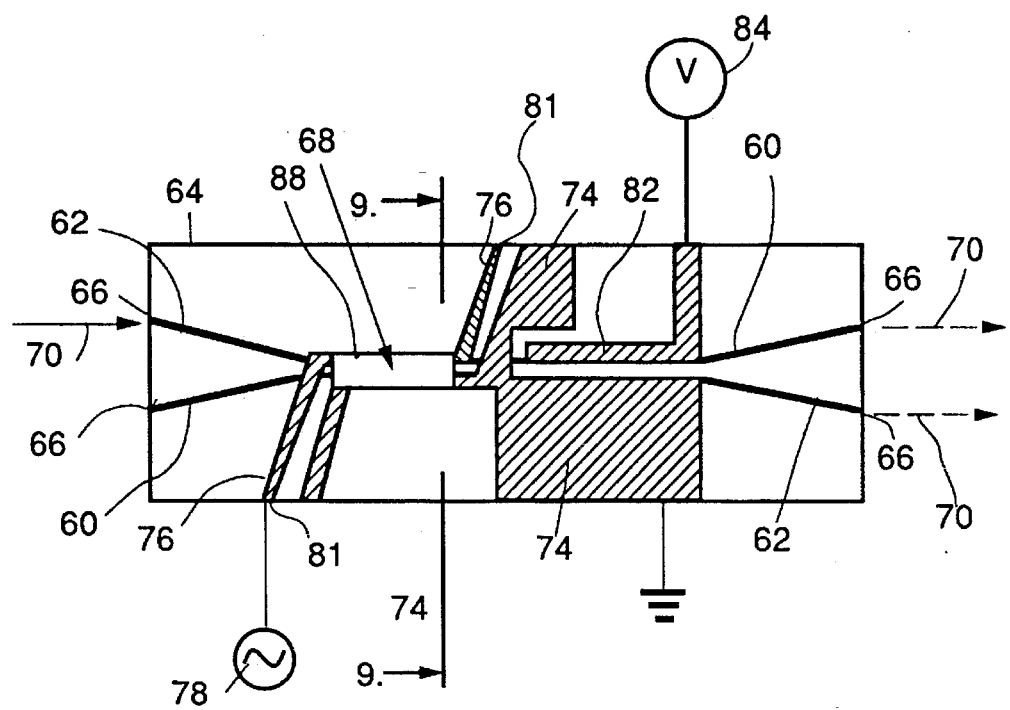
FIG. 8 is a plan view of a preferred embodiment of a linearized directional-coupler modulator with the velocity-matched electrodes of the present invention.
Figure 9:
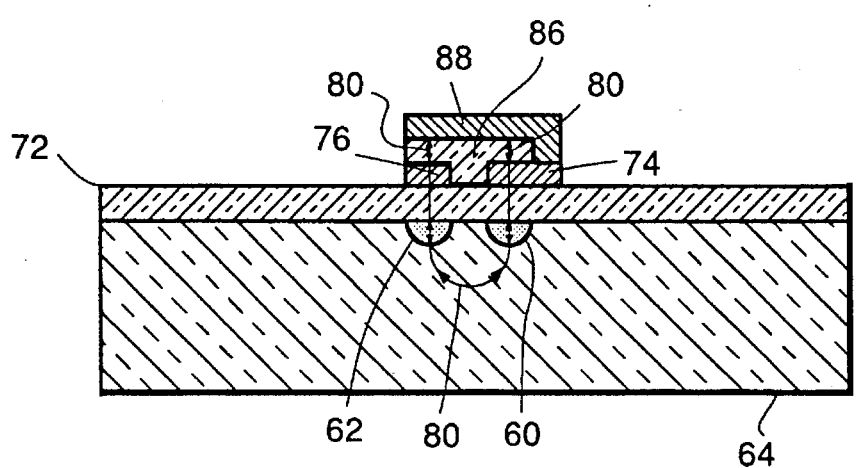
FIG. 9 is a sectional view taken along the section line 9—9 of FIG. 7.

FIGS. 8 and 9 illustrate a preferred embodiment of a linearized directional-coupler modulator with the velocity-matched electrodes of the present invention. Two optical waveguides 60 and 62 are disposed on an electro-optic substrate 64, preferably a z-cut LiNbO$_3$ substrate. The optical waveguides are preferably formed by diffusing titanium metal into the LiNbO$_3$ substrate 64. The titanium increases the index of refraction of the LiNbO$_3$ by an amount sufficient to create an optical waveguide. The waveguides 60 and 62 are preferably designed so that they are single-mode at an operating wavelength of 1.3 microns or 1.55 microns. To do this, the waveguide diameters are 6 to 7 microns.

The waveguides are fabricated parallel to each other and in close proximity to each other along the active region of the coupler 68 so that light 70 launched into one waveguide couples to the other waveguide via evanescent coupling. The amount of optical energy that couples from one waveguide to the other is dictated by the length of the active region 68 and by the distance between the waveguides along the active region. In the preferred embodiment, the active region is designed so that light 70 launched into one waveguide couples to the second waveguide and back to the first waveguide when no voltage is applied. This is accomplished by making the active region 68 approximately 4 cm long for waveguides that are 6 to 7 microns in diameter and separated by approximately 6 to 7 microns. The ends of the waveguides 66 are spaced far enough apart so that the light can be conveniently coupled in and out of the waveguides.

A first dielectric layer 72 (shown in FIG. 9), preferably a 1.2 micron thick SiO$_2$ layer, is disposed on top of the LiNbO$_3$ substrate 64 and the waveguides 60 and 62. A ground electrode 74, preferably a 2 micron thick gold electrode, is disposed on the top of the dielectric layer 72 so that a portion of the electrode 74 is directly above the first waveguide 60. The portion of the ground electrode 74 that is above the first waveguide 60 is preferably 8 microns wide.

A first active electrode 76, preferably a 2 micron thick, 8 micron wide gold electrode, is disposed on top of the dielectric layer 72 so that a portion is directly over the second waveguide 62 along the first approximately 1.5 cm of the active region 68. An RF voltage from a source 78 is applied to the first active electrode 76 and the resulting RF electric field 80 propagates through the first 1.5 cm of the active region and modulates the evanescent coupling between the waveguides 60 and 62 via the electro-optic effect. The first active electrode 76 is preferably tapered at its opposite ends 80 to make its impedance 50 ohms.

A second active electrode 82, preferably a 2 micron thick, 20 micron wide gold electrode, is disposed on top of the dielectric layer 72 so that a portion is directly over the second waveguide 62 along the last approximately 1.5 cm of the active region 68. The second active electrode 82, in conjunction with the ground electrode 74, applies a DC voltage from a DC voltage supply 84 across the waveguides along the last 1.5 cm of the active region. The DC voltage can be adjusted so that the optical modulation exhibits linearized behaviour, as discussed above.

Figure 10:
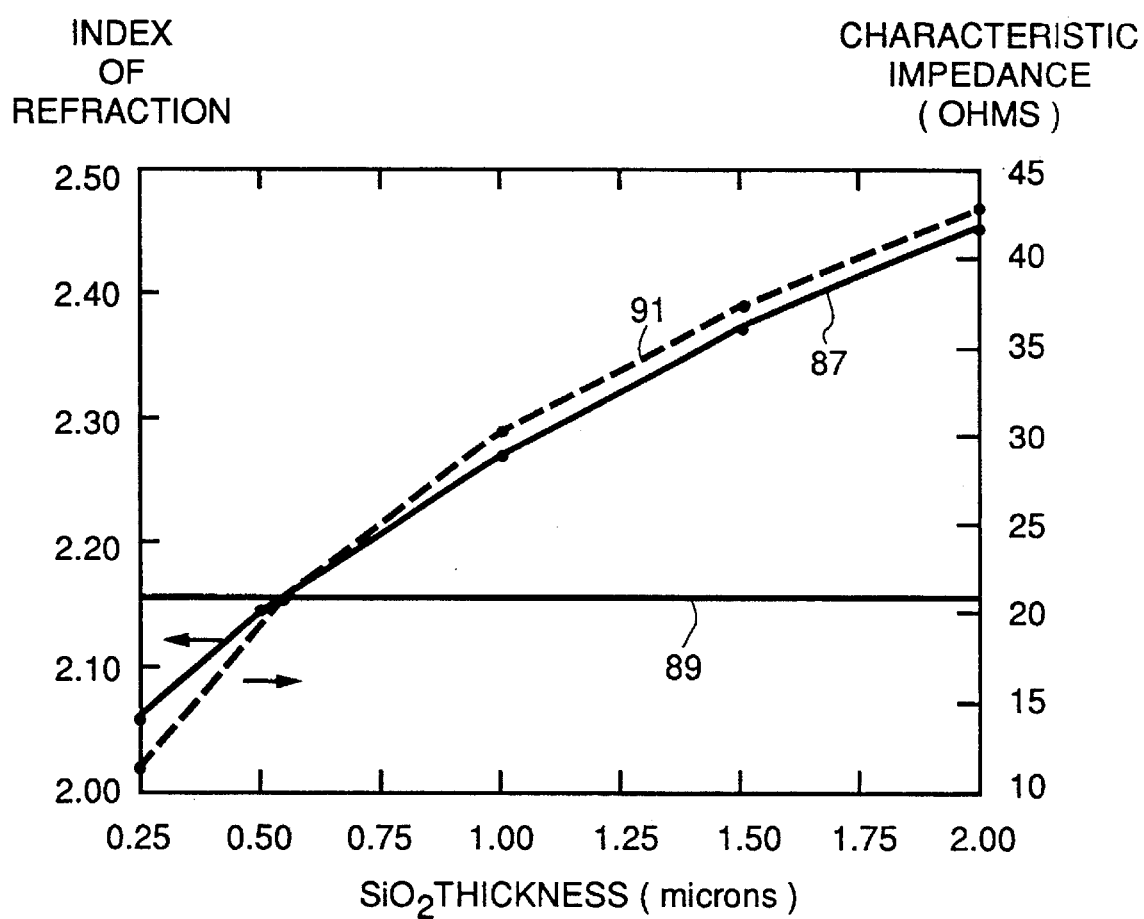
FIG. 10 is a graph illustrating the effective RF index of refraction as a function of the thickness of an SiO$_2$ layer for the embodiment of FIGS. 8 and 9.
Figure 11A:
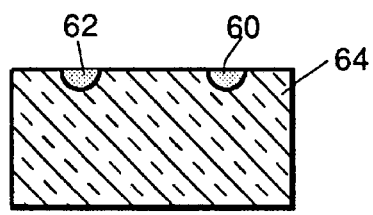
FIGS. 11a–11e are cross-sectional views illustrating successive steps in the formation of a linearized directional-coupler modulator with velocity-matched electrodes.
Figure 11B:
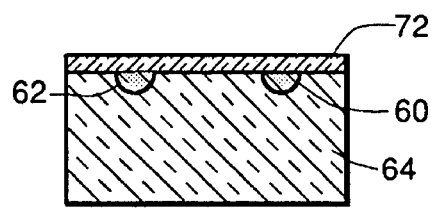
Figure 11C:
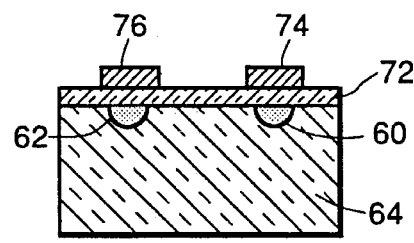
Figure 11D:
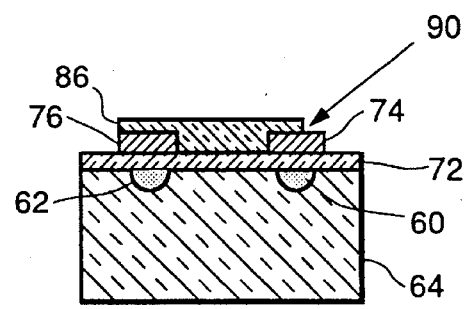
Figure 11E:
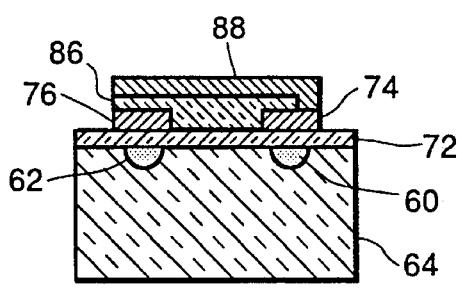

A second dielectric layer 86, preferably SiO$_2$, is disposed on top of the first active electrode 76 and the ground electrode 74 over the first 1.5 cm of the active region 68. The thickness of the second SiO$_2$ layer 86 determines the effective RF index of refraction. The graph of FIG. 10 illustrates a theoretical plot of the effective RF index of refraction as a function of the thickness of the second SiO$_2$ layer 86. As can be seen by this plot, the effective RF index of refraction 87 matches the optical index of refraction 89 at an SiO$_2$ layer thickness of approximately 0.53 microns. Therefore, the second SiO$_2$ layer 86 is preferably 0.53 microns thick. The characteristic electrode impedance 91 for a dielectric layer thickness of 0.53 microns is approximately 20 ohms. However, as explained above, the first active electrode is preferably tapered at its opposite ends to bring its impedance up to 50 ohms.

Referring back to FIGS. 8 and 9, the second SiO$_2$ layer disposed over the electrodes 74 and 76 and also fills the space between the electrodes.

A metal layer 88, preferably gold, is disposed on top of the second dielectric layer 86 and wraps around the second dielectric layer 86 to contact the ground electrode 74. The gold layer 88 is preferably approximately 2 microns thick on top of the second dielectric layer 86.

The electrodes 74, 76, and 82 are positioned over the waveguides 60 and 62 so that the electric field lines 80 are normal to the surface of the LiNbO$_3$ substrate 64 at the waveguide locations. In z-cut LiNbO$_3$, this electric field orientation utilizes the largest electro-optic coefficient when the light 70 polarization direction is parallel to the electric field lines 80. Therefore, when z-cut LiNbO$_3$ is used as the substrate, the input light 70 should be vertically polarized.

FIGS. 10a–10f illustrate a preferred fabrication method for the velocity-matched linearized directional-coupler modulator of FIGS. 8 and 9. Initially, as shown in FIG. 10a, two waveguides 60 and 62 are formed in the LiNbO$_3$ substrate 64 by well-known titanium in-diffusion techniques, in which a thin layer of titanium (preferably 10 to 100 nm thick) is evaporated onto the substrate 64 through a photomask that defines the waveguide locations. The substrate 64 is then baked at approximately 1,000 degrees Celsius for approximately 7 hours in a wet oxygen atmosphere. During the baking process, the titanium diffuses into the LiNbO$_3$ and increases the refractive index of the LiNbO$_3$ at the titanium locations from approximately 2.15 to approximately 2.16. This index difference is enough to create an optical waveguide. The photomask is configured so that the resulting waveguides are approximately 6 to 7 microns in diameter, 4 cm long, and are separated by 6 to 7 microns.

Next, as illustrated in FIG. 10b, an SiO₂ layer 72, preferably 1.2 microns thick, is sputtered onto the substrate 64 using standard RF-sputtering techniques.

In the next step (FIG. 10c), a layer of photoresist (not shown) is laid down and exposed through a mask that passes the photoresist exposure light at the locations of the ground electrode, first active electrode, and second active electrode. The exposed photoresist is removed through development and a thin 0.03 micron layer of titanium or chrome (not shown) is deposited onto the SiO₂ layer 72, followed by a 2 micron layer of gold. The titanium or chrome helps the gold layer adhere to the SiO₂. The remaining unexposed photoresist is removed with a solvent, such as acetone, and the gold that was deposited onto the unexposed photoresist comes off, leaving behind a 2 micron thick gold ground electrode 74, first active electrode 76, and second active electrode (not shown).

Next, as illustrated in FIG. 10d, a second SiO₂ layer 86 is RF-sputtered onto the electrodes and onto a portion of the first SiO₂ layer 72 using standard photolithography techniques to define the layer 86 location. The second layer 86 preferably covers only the first active electrode 76 and the first 1.5 cm of the ground electrode 74. The thickness of the SiO₂ layer 86 on top of the electrodes 74 and 76 is preferably 0.53 microns, as required to match the RF refractive index to the optical refractive index along the first 1.5 cm of the active region. A small gap 90, preferably 2 microns wide, is left open over the ground electrode 74.

Finally, as illustrated in FIG. 10e, a layer of gold 88 is deposited onto the second SiO₂ layer 86 using standard photolithography techniques to define the layer 88 location. The small gap (element 90 in FIG. 10d) left open in the second SiO₂ layer over the ground electrode 74 allows the gold layer 88 to wrap around the second SiO₂ layer and contact the ground electrode 74. The section of the gold layer 88 on top of the second SiO₂ layer is preferably 2 microns thick.

While several illustrative embodiments of the invention have been shown and described, numerous variations and alternate embodiments will occur to those skilled in the art. For example, although the precise velocity matching achieved by the velocity-matched electrodes of the present invention make them most suitable for linearized directional-coupler modulators, they can be used in other travelling-wave modulators, as pointed out above. The thickness of the second SiO₂ layer is simply adjusted to accomodate the RF refractive index requirement for any particular travelling-wave modulator. Such variations and alternate embodiments are contemplated, and can be made without departing from the spirit and scope of the appended claims.

I claim:

1. A velocity-matched electrode structure for modulating the propagation constant of an optical waveguide on an electro-optic substrate, comprising:

an active electrode and a ground electrode on said substrate for applying an alternating electric field across said waveguide to modulate the propagation constant of said waveguide, a first dielectric layer deposited on said electrodes, said dielectric layer having a dielectric constant which is lower than the dielectric constant of the electro-optic substrate and a thickness such that the effective RF index of refraction for said alternating electric field substantially matches the effective index of refraction for an optical signal that is propagating along said waveguide, thereby velocity-matching said electric field with said optical signal, and an electrically conductive layer on said dielectric layer that is electrically connected to said ground electrode.

2. The velocity-matched electrodes of claim 1, further comprising a second dielectric layer having a dielectric constant which is lower than the dielectric constant of the electro-optic substrate, said second dielectric layer being deposited between said waveguides and said electrodes to electrically isolate said electrodes from said waveguides and lower the effective dielectric constant that said electric field experiences.

3. The velocity-matched electrodes of claim 2, wherein said first and second dielectric layers comprise SiO₂ layers.

4. A linearized directional-coupler modulator with velocity-matched electrodes for modulating an optical signal, comprising:

an electro-optic substrate with an index of refraction that can be varied with the application of an electric field, first and second optical waveguides on said substrate that are parallel and in close lateral proximity to each other, so that an optical signal launched into the first waveguide couples into the second waveguide over a first portion of said waveguides and back to the first waveguide over a second portion of said waveguides via evanescent coupling, a first low dielectric constant layer on said substrate and said waveguides, a first ground electrode and a first active electrode on said first dielectric layer for applying an alternating electric field across said first portions of said waveguides that propagates along said electrodes in the same propagation direction as said optical signal and that modulates the evanescent coupling between said first portions, a second ground electrode and a second active electrode on said first dielectric layer for applying a DC voltage across said second portions of said waveguides to modulate the evanescent coupling between said second portions and to control the linearity of said modulator, a second low dielectric constant layer on said first electrodes and said first dielectric layer, and an electrically conductive layer on said second dielectric layer in electrical contact with said first ground electrode, said first and second dielectric layers lowering the effective dielectric constant that said alternating electric field experiences as it propagates along said first electrodes so that the effective index of refraction for said electric field substantially matches the effective index of refraction for an optical signal that is propagating along said waveguide, thereby velocity-matching said electric field with said optical signal.

5. The modulator of claim 4, wherein said electro-optic substrate comprises LiNbO₃.

6. The modulator of claim 5, wherein said first and second low dielectric constant layers comprise SiO₂ layers.

7. The modulator of claim 4, wherein said first and second ground electrodes are implemented with a common ground electrode.

8. A method for producing a velocity-matched electrode structure for modulating the propagation constant of an optical waveguide on an electro-optic substrate, comprising the steps of:

fabricating an active electrode and a ground electrode on said substrate for applying an alternating electric field across said waveguide to modulate the propagation constant of said waveguide, depositing a first dielectric layer on said electrodes, said dielectric layer having a dielectric constant which is lower than the dielectric constant of the electro-optic substrate and a thickness such that the effective RF index of refraction for said alternating electric field substantially matches the effective index of refraction for an optical signal that is propagating along said waveguide, thereby velocity-matching said electric field with said optical signal, and fabricating an electrically conductive layer on said dielectric layer that is electrically connected to said ground electrode.

9. The method of claim 8, further comprising the step of depositing a second dielectric layer having a dielectric constant which is lower than the dielectric constant of the electro-optic substrate, said second dielectric layer being deposited between said waveguides and said electrodes to electrically isolate said electrodes from said waveguides and lower the effective dielectric constant that said electric field experiences.

10. The method of claim 9, wherein said first and second dielectric layers are fabricated by ion sputtering $SiO_2$ layers.

11. A method for producing a linearized directional-coupler modulator with velocity-matched electrodes for modulating an optical signal, comprising:

fabricating first and second optical waveguides on an electro-optic substrate that are parallel and in close lateral proximity to each other, so that an optical signal launched into the first waveguide couples into the second waveguide over a first portion of said waveguides and back to the first waveguide over a second portion of said waveguides via evanescent coupling, fabricating a first low dielectric constant layer on said substrate and said waveguides, fabricating a first ground electrode and a first active electrode on said first dielectric layer for applying an alternating electric field across said first portions of said waveguides that propagates along said electrodes in the same propagation direction as said optical signal and that modulates the evanescent coupling between said first portions of said waveguides via the electro-optic effect, fabricating a second ground electrode and a second active electrode on said first dielectric layer for applying a DC voltage across said second portions of said waveguides to modulate the evanescent coupling between said second portions and to control the linearity of said modulator, fabricating a second low dielectric constant layer on said first electrodes and said first dielectric layer, and fabricating an electrically conductive layer on said second dielectric layer in electrical contact with said first ground electrode, said first and second dielectric layers lowering the effective dielectric constant that said alternating electric field experiences as it propagates along said first electrodes so that the effective index of refraction for said electric field substantially matches the effective index of refraction for an optical signal that is propagating along said waveguide, thereby velocity-matching said electric field with said optical signal.

12. The method of claim 11, wherein said optical waveguides are fabricated by:

placing a photomask on the top side of said substrate with openings that define the physical dimensions of said waveguides, vacuum evaporating titanium metal onto said substrate through the openings in said photomask, removing said photomask from said substrate, and baking said substrate at an approximate temperature of 1,000 degrees Celsius for approximately 7 hours so that titanium diffuses into a portion of said substrate and raises the index of refraction of said portion.

13. The method of claim 11, wherein said first dielectric layer is fabricated by RF-sputtering a layer of $SiO_2$ on the top of said substrate and said waveguides.

14. The method of claim 11, wherein said first and second electrodes are fabricated by:

placing a layer of photoresist on the top of said first dielectric layer, exposing and removing areas of said photoresist that correspond to the location and geometry of said electrodes so that said underlying dielectric layer is exposed at said areas, evaporating a layer of titanium on said exposed areas of said dielectric layer, evaporating a layer of gold on said titanium layer, and lifting off the unexposed photoresist so that the titanium and gold on the unexposed photoresist are lifted off.

15. The method of claim 11, wherein said second dielectric layer is fabricated by RF-sputtering a layer of $SiO_2$ on said first electrodes and said first dielectric layer through a photomask.

16. The method of claim 11, wherein said electrically conductive layer is fabricated by:

evaporating a layer of titanium on said second dielectric layer, and evaporating a gold layer on said titanium layer so that said gold layer wraps around a side of said second dielectric layer and electrically contacts said first ground electrode.

* * * * *